July 19, 1960  J. WASHBURN  2,946,034
BUS DUCT STRUCTURE
Filed July 19, 1957
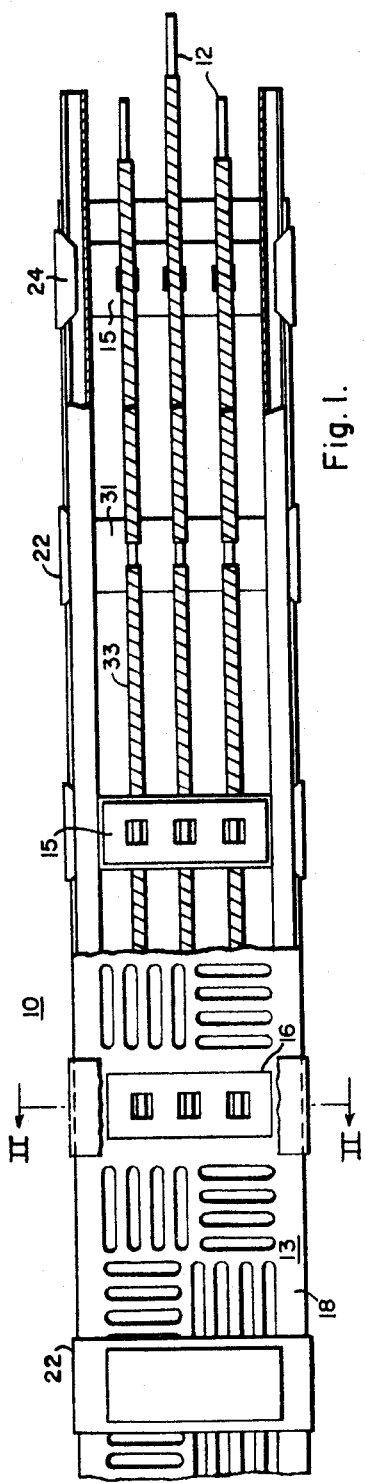
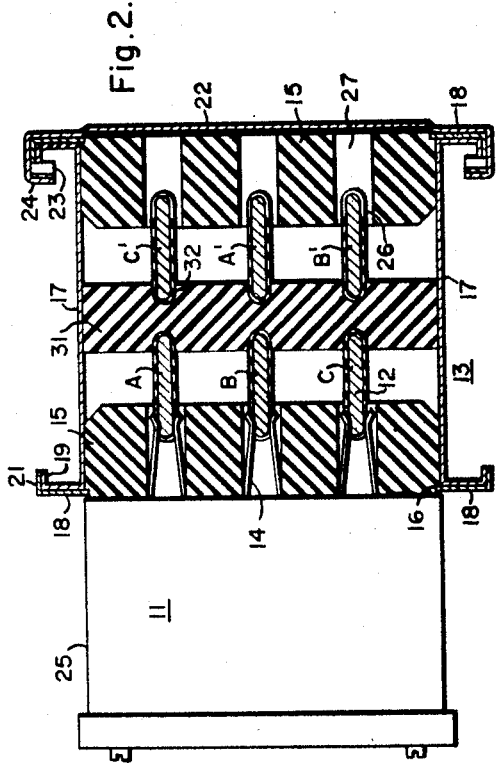
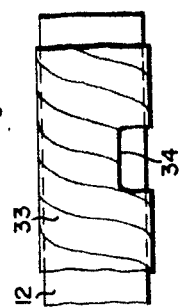
INVENTOR
Joseph Washburn
BY
ATTORNEY

United States Patent Office 2,946,034
Patented July 19, 1960

2,946,034

BUS DUCT STRUCTURE

Joseph Washburn, Livonia, Mich., assignor to Westinghouse Electric Corporation, East Pittsburgh, Pa., a corporation of Pennsylvania Filed July 19, 1957, Ser. No. 673,031

8 Claims. (Cl. 339—22)

This invention relates, generally, to current distribution apparatus and, more particularly, to apparatus commonly known as bus duct in which rigid bus bars are enclosed in a generally rectangular metal housing having insulators disposed within the housing to support the bus bars.

Bus duct is available in different types. One type is feeder duct, which is utilized to carry power from transformers to distribution points. Another type is plug-in duct, which carries the power from distribution points to utilization points, such as motors, lighting and other electrical equipment which are connected to the bus bars in the duct housing by means of plug-in units attached to the housing. Low impedance duct is another type which is usually utilized for long feeder runs or where a minimum voltage drop is important.

In low impedance duct of the type shown in Togesen et al., Patent 2,287,502, six bus bars are provided for a three phase system. Thus, there are two bars A and A' for one phase, two bars B and B' for another phase, and two bars C and C' for a third phase. The bus bars are disposed in pairs A—C', B—A', and C—B' with the bars of each pair mounted relatively closely together, thereby decreasing the voltage drop in the system.

In the low impedance duct of another type, which is described in Dyer et al., Patent 2,653,991, the bus bars are arranged in two sets, with three bars in each set. The corresponding phases for the two sets are designated A, B, C and A', B', C' and the two conductors for each phase are connected in parallel-circuit relation. The bus bars in each set are spaced relatively closely together which reduces the overall impedance to a minimum amount.

The bus duct structures described in the foregoing patents are not suitable for plug-in duct and an object of this invention is to provide bus duct having a relatively low impedance which may be utilized as plug-in duct.

Another object of this invention is to provide bus duct having oppositely disposed insulators which cooperate with an insulator disposed between bus bars mounted inside a housing to support the bus bars.

A further object of the invention is to provide bus duct having bus bars disposed in three parallel planes with two bars in each plane.

Still another object of the invention is to provide bus duct having plug-in openings in oppositely disposed sides of the duct housing with pairs of bus bars mounted in parallel planes extending at right angles to the sides of the housing having the plug-in openings therein.

Other objects of the invention will be explained fully hereinafter or will be apparent to those skilled in the art.

In accordance with one embodiment of the invention, six substantially flat bus bars are disposed in three pairs with the bars of each pair mounted relatively closely together. The pairs of bars are disposed in parallel planes which extend at right angles to the sides of the duct housing having openings therein for receiving the contact stabs of plug-in units attached to the housing. The bus bars are supported by insulators mounted at the openings in the housing and having openings therein into which the stabs are inserted to engage the bus bars. Additional insulators are disposed between the bus bars to separate the closely spaced bars and to enable the structure to withstand short circuit stresses.

For a better understanding of the nature and objects of the invention, reference may be had to the following detailed description taken in conjunction with the accompanying drawing, in which:

Figure 1 is a view, in side elevation, of part of a section of bus duct embodying the principal features of the invention, portions of the structure being broken away for clearness; and some of the insulators being removed to show the structure behind.

Fig. 2 is an enlarged view, partly in section and partly in elevation, of the bus duct shown in Fig. 1, the section being taken along the line II—II in Fig. 1, and Fig. 3 is a detail view of a portion of one of the bus bars and the insulation covering the bar.

Referring to the drawing, the structure shown therein comprises a portion of a bus duct 10 and a plug-in unit 11 which is disposed on one side of the duct 10. A plurality of substantially flat bus bars 12 are mounted inside the duct housing 13 which is generally rectangular in cross-section. The plug-in unit 11 is provided with stab connectors 14 which engage certain of the bus bars, as will be described more fully hereinafter. The bus bars 12 are supported by insulators 15 which are disposed inside the housing 13 at openings 16 provided in opposite sides of the housing.

As shown most clearly in Fig. 2, the housing 13 comprises generally channel-shaped top and bottom walls 17 and side walls 18 which are preferably of the ventilated type. The top and bottom walls 17 have inwardly extending flanges 19 which are overlapped by flanges 21 on the side walls 18. As previously explained, the openings 16, for receiving the stab connectors 14, are located at regular intervals in the side walls 18 on both sides of the duct. A cover plate 22 is provided for each opening 16 in the side walls 18. The cover plates 22 are slidably mounted on the side walls 18 and may be retained in position by leaf springs 23 which are disposed between flanges 24 on the cover plate 22 and the edges of the flanges 19 and 21 on the housing 13. When it is desired to install a plug-in unit in a particular opening, the cover plate may be slid along the housing 13 to provide access to the opening 16.

The plug-in unit 11 may be of the type described in Patent 2,641,636, issued June 9, 1953, to W. F. Born et al. A circuit interrupter (not shown) which may be either an automatic circuit breaker or a manually operable switch, is mounted inside the metal casing 25 of the plug-in unit. The circuit interrupter is electrically connected to the stab connectors 14, thereby connecting the interrupter to bus bars 12 when it is properly installed on the bus duct housing 13.

It will be understood that power conductors (not shown) may be connected to the load terminals on the interrupter unit to supply power for operating electric apparatus. In this manner, the plug-in unit may be located at the most convenient position along the bus duct for supplying power to various machines or other apparatus in a factory. The plug-in unit may retained on the duct housing by suitable clamping devices (not shown). The clamping device may be of the type described in Patent 2,725,541, issued November 29, 1955, to W. F. Born et al.

As previously explained, the bus bars 12 are supported in the housing 13 by opposed pairs of insulators 15. An insulator 15 is located at each opening 16 in each side of the duct housing. As shown in Fig. 2, each insulator 15 is provided with three transverse grooves 26 for receiving three of the bus bars 12. Each insulator 15 is also provided with three openings 27 for receiving the stab connectors 14 of a plug-in unit.

As also shown in Fig. 2, the bus bars 12 are disposed in three pairs with the two bus bars of each pair mounted in a plane which extends at right angles to the sides 18 which contain the openings for receiving the stabs of the plug-in units. As shown in Fig. 2, the distance between adjacent edges of the two bus bars of each pair is less than the distance between the pairs of bus bars. Thus, when the bus bars of one pair are connected to phases A and C, and the bus bars of another pair are connected to phases B and A, and the bus bars of the third pair are connected to phases C and B, as shown in Fig. 2, the relatively close spacing of the bars of each pair reduces the reactance, thereby decreasing the voltage drop in the system.

In addition to the opposed insulators 15, an insulator 31 is provided between the pairs of bus bars at each pair of openings 16 in the duct housing. Each insulator 31 is provided with six transverse grooves 32 for receiving the oppositely disposed bus bars of the three pairs of bars. Thus, the bus bars are firmly held in position inside the housing 13 between a pair of opposed plug-in insulators 15 with the center insulators 31 between the two groups of bus bars. Accordingly, the structure is enabled to withstand relatively high stresses produced by short-circuit currents since the bus bars cannot move laterally. Furthermore, the bus bars cannot move edgewise when they are being engaged by the stab connectors of the plug-in units.

As shown in Fig. 1, the bus bars 12 are preferably covered with insulating tape 33, except for cut out portions 34 adjacent the edges of the bars at the openings in the duct housing provided for the installation of the plug-in units. The insulators 31, which are located at these points, increase the creepage distance over the insulation between the cut outs 34 for the stabs. Since the bus bars 12 are covered with insulation 33, the side walls 18 may be perforated for ventilation and increase the current-carrying capacity of the bus duct without overheating. The insulation 33 prevents the bus bars from being touched by anything inserted through the ventilating openings. The cover plates 22 are without ventilating openings to protect the bars 12 from being touched at the cut outs 34.

It is apparent that the present structure is suitable for conducting relatively large amounts of current with a relatively small voltage drop since the bus bars are so arranged that the system has a relatively low impedance. Furthermore, the bus bars are so arranged that they may be engaged by the stab connectors of plug-in units installed on the sides of the duct housing. Thus, the present structure has the advantages of both plug-in bus duct and low-impedance duct. Furthermore, the bus bars are so supported within the housing that the structure is enabled to withstand relatively high short-circuit stresses.

Since numerous changes may be made in the above described construction and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. A bus duct section comprising a generally rectangular housing having spaced openings in opposite sides thereof, an insulator at each opening in the housing, each insulator having openings therein for receiving stab connectors of a plug-in unit, at least six substantially flat bus bars disposed in the housing in three pairs, the bars in each pair being of different phases and lying in a single plane which extends at right angles to the sides of the housing having the openings therein, additional insulators disposed between adjacent edges of said bars, said insulators having transverse grooves therein for receiving the edges of the bus bars, and one bar of each pair being engageable by a stab connector of a plug-in unit on one side of the housing and the other bar of each pair being engageable by a stab connector of a plug-in unit on the opposite side of the housing.

2. A bus duct section comprising a generally rectangular housing having spaced openings in opposite sides thereof, an insulator inside the housing at each opening, each insulator having openings therein for receiving stab connectors, a plurality of substantially flat bus bars disposed in the housing in pairs, the bars in each pair lying in a single plane which extends at right angles to the sides of the housing having the openings therein, transverse grooves in said insulators for receiving the bars, and one bar of each pair being engageable by a stab connector of a plug-in unit on one side of the housing and the other bar of each pair being engageable by a stab connector of a plug-in unit on the opposite side of the housing.

3. A bus duct section comprising a generally rectangular housing having spaced openings in opposite sides thereof, an insulator inside the housings at each opening, each insulator having openings therein for receiving stab connectors, a plurality of substantially flat bus bars disposed in the housing in pairs, the bars in each pair lying in a single plane which extends at right angles to the sides of the housing having the openings therein, and the distance between adjacent edges of the bars in each pair being less than the distance between the pairs of bars.

4. A bus duct section comprising a generally rectangular housing having spaced openings in opposite sides thereof, an insulator inside the housing at each opening, each insulator having openings therein for receiving stab connectors, a plurality of substantially flat bus bars disposed in the housing in pairs, the bars in each pair lying in a single plane which extends at right angles to the sides of the housing having the openings therein, the distance between adjacent edges of the bars in each pair being less than the distance between the pairs of bars, and additional insulators disposed between adjacent edges of said bars, said insulators having transverse grooves therein for receiving the edges of the bus bars.

5. A bus duct section comprising a generally rectangular housing having spaced openings in opposite sides thereof, an insulator inside the housing at each opening, each insulator having openings therein for receiving stab connectors, a plurality of substantially flat bus bars disposed in the housing in pairs, the bars in each pair being of different phases and lying in a single plane which extends at right angles to the sides of the housing having the openings therein, transverse grooves in said insulators for receiving the bars, and one bar of each pair being engageable by a stab connector of a plug-in unit on one side of the housing and the other bar of each pair being engageable by a stab connector of a plug-in unit on the opposite side of the housing.

6. A bus duct section comprising a generally rectangular housing having spaced openings in opposite sides thereof, an insulator inside the housing at each opening, each insulator having openings therein for receiving stab connectors, a plurality of substantially flat bus bars disposed in the housing in pairs, the bars in each pair being of different phases and lying in a single plane which extends at right angles to the sides of the housing having the openings therein, the distance between adjacent edges of the bars in each pair being less than the distance between pairs of bars, additional insulators disposed between adjacent edges of said bars, and transverse grooves in said insulators for receiving the edges of the bus bars.

7. A bus duct section comprising a generally rectangular housing having spaced openings in opposite sides thereof, a plurality of substantially flat bus bars disposed in the housing in pairs, the bars in each pair lying in a single plane which extends at right angles to the sides of the housing having the openings therein, insulators disposed inside the housing for supporting the bus bars, said insulators having transverse grooves therein for receiving edges of the bus bars, and said bars being insulated except adjacent to said openings where a portion of each bar is uninsulated for receiving stab connectors of a plug-in unit.

8. A bus duct section comprising a generally rectangular housing having spaced openings in opposite sides thereof, a plurality of substantially flat bus bars disposed in the housing in pairs, the bars in each pair being of different phases and lying in a single plane which extends at right angles to the sides of the housing having the openings therein, the distance between adjacent edges of the bars in each pair being less than the distance between pairs of bars, insulators disposed inside the housing and having transverse grooves therein for receiving the outer edges of the bus bars, additional insulators disposed between adjacent edges of said bars, and said bars being insulated except adjacent to said openings where a portion of each bar is uninsulated for receiving stab connectors of a plug-in unit.

References Cited in the file of this patent

UNITED STATES PATENTS

| | | |
|---|---|---|
| 2,318,860 | Huguelet | May 11, 1943 |
| 2,343,216 | Frank et al. | Feb. 29, 1944 |
| 2,653,991 | Dyer et al. | Sept. 29, 1953 |
| 2,725,541 | Born et al. | Nov. 29, 1955 |
| 2,837,699 | Fore | June 3, 1958 |